United States Patent
Zhang

(10) Patent No.: US 6,687,844 B1
(45) Date of Patent: Feb. 3, 2004

(54) METHOD FOR CORRECTING CLOCK DUTY CYCLE SKEW BY ADJUSTING A DELAYED CLOCK SIGNAL ACCORDING TO MEASURED DIFFERENCES IN TIME INTERVALS BETWEEN PHASES OF ORIGINAL CLOCK SIGNAL

(75) Inventor: Binglong Zhang, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 399 days.

(21) Appl. No.: 09/671,314

(22) Filed: Sep. 28, 2000

(51) Int. Cl.[7] ................................. G06F 1/04
(52) U.S. Cl. .................. 713/503; 713/500; 713/501
(58) Field of Search ................. 713/500, 501, 713/502, 503; 714/689, 700

(56) References Cited

U.S. PATENT DOCUMENTS 5,491,440 A * 2/1996 Uehara et al. .............. 327/172
6,181,178 B1 * 1/2001 Choi .......................... 327/175
6,326,827 B1 * 12/2001 Cretti et al. ................ 327/175
6,384,652 B1 * 5/2002 Shu ............................ 327/175
6,578,154 B1 * 6/2003 Wynen et al. .............. 713/500

* cited by examiner

*Primary Examiner*—Thomas Lee
*Assistant Examiner*—Paul Yanchus, III
(74) *Attorney, Agent, or Firm*—Schwegman, Lundberg, Woessner & Kluth, P.A.

(57) ABSTRACT

A device and method to detect and correct clock duty cycle skew detected in high performance microprocessor having a very high frequency clock. The device relies on a delay chain circuit to delay the clock signal and determine the presence of clock duty cycle skew. The device uses simple latches, flops and phase-detectors to compare and identify the nature of the clock duty cycle skew. Simple logic is then employed to measure and determine the amount and direction of de-skew to apply to the clock signal. After the de-skew operation, the clock duty cycle cycles used to control the execution of the microprocessor are of uniform time duration.

22 Claims, 5 Drawing Sheets

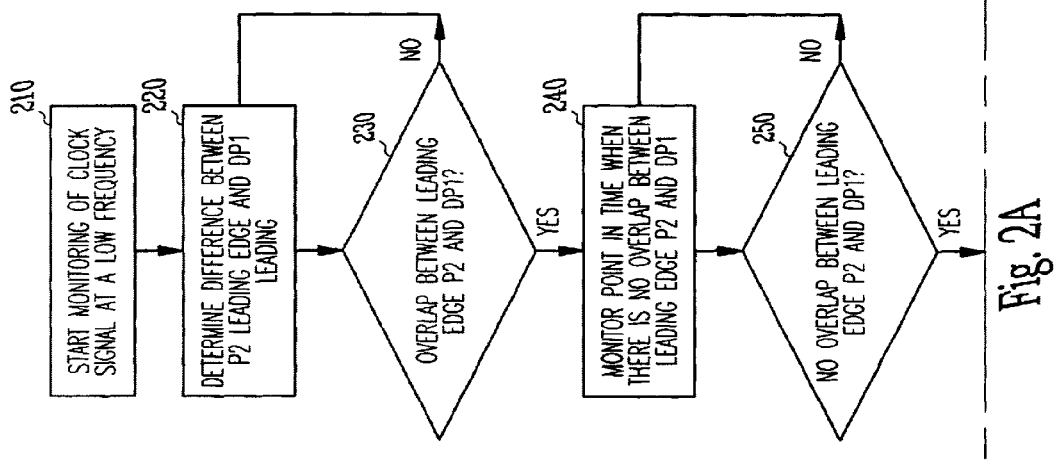

METHOD FOR CORRECTING CLOCK DUTY CYCLE SKEW BY ADJUSTING A DELAYED CLOCK SIGNAL ACCORDING TO MEASURED DIFFERENCES IN TIME INTERVALS BETWEEN PHASES OF ORIGINAL CLOCK SIGNAL

FIELD

The invention relates to a device and method to correct for clock duty cycle skew in a processor.

BACKGROUND

In the rapid development of computers many advancements have been seen in the areas of processor speed, throughput, communications, and fault tolerance. Microprocessor speed is measured in cycles per second or hertz. Today's high-end 32-bit microprocessors operate at over 1 Ghz (gigahertz), one billion cycles per second, and in the near future this is expected to go substantially higher. At this sort of cycle speed a clock would have to generate a pulse or cycle at least once each billionth of a second and usually several orders of magnitude faster. A clock cycle is composed of a high phase and a low phase. A clock duty cycle should be half or 50% of the entire clock cycle which would indicate that the high phase has the same time duration as the low phase. It is during this clock duty cycle that the processor executes programmed functions.

In order to achieve such a fast timing requirement, quartz crystals are utilized and have been found to be very accurate. However, in order to generate a clock duty cycle more than the mere presence of a crystal is needed. Additional buffers and electrical circuitry are necessary in order to generate a clock duty cycle. These additional buffers and electrical circuitry, as well as the crystal itself, will generate inaccuracies in the time duration of a given clock duty cycle when the duration of a clock cycle is a billionth of a second or less. Therefore, it is possible for a clock embedded in a microprocessor to generate clock duty cycles that very slightly in time duration from one clock duty cycle to the next.

Until recently this very slight difference in the duration of a clock duty cycle has not proven to be a significant problem for microprocessor manufacturers. Processor speeds were slow enough so that these slight differences in the duration of a clock duty cycle were never noticed. However, at cycle speeds of 1 gigahertz and above, even the slightest variation in clock duty cycle duration, otherwise known as clock duty cycle skew, can have a very detrimental impact on processor performance.

The reason for such an impact is that a processor is required to perform a certain operation or execute an instruction or a portion of an instruction within a single clock duty cycle. If a clock duty cycle is shorter than expected, then the processor will not be able to complete the operation or instruction within that clock duty cycle as expected. Further, if a clock duty cycle is longer than desired, then the processor will sit idle for some portion of that clock duty cycle. If a pipeline architecture is employed in a processor then the presence of clock duty cycle skew would have a further detrimental impact on processor performance. In a pipelined processor architecture within each clock duty cycle different instructions or functions are executed at various stages simultaneously. This sort of architecture relies on each instruction or function being executed within a given clock duty cycle.

Therefore, failure to complete a function in a given clock duty cycle will defeat the benefits achieved from pipelining.

Another factor that further complicates the manufacturing of high-speed microprocessors is the fact that clock duty cycle skew is not a function of processor design but rather of the manufacturing process itself and the materials used. No two crystals are alike and neither are the buffers and additional electrical circuitry required. Therefore, in spite of the very close tolerances in microprocessor manufacture, each microprocessor exhibits a slightly different clock duty cycle skew. Thus, it has not been possible to design a simple circuit that can correct clock duty cycle skew for all microprocessors since each individual microprocessor may exhibit a different clock duty cycle skew.

Attempts to correct for clock duty cycle skew in high-performance microprocessors have utilized analog integrator circuits that convert the duty cycle time into a voltage value. However, these attempts have proven to be complex to implement and have failed to provide a deterministic system and method for de-skewing clock duty cycles.

Therefore, what is needed is a device and method that will detect clock duty cycle skew within a microprocessor, determine the precise nature of the clock duty cycle skew, and adjust the clock signal to eliminate the clock duty cycle skew. This device and method must further be able to identify different types of clock duty cycle skew and adjust a clock signal accordingly. This device and method must also require as little logic as possible and therefore take up a minimal amount of space within the microprocessor.

BRIEF DESCRIPTION OF THE DRAWINGS

The foregoing and a better understanding of the present invention will become apparent from the following detailed description of exemplary embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and the invention is not limited thereto.

The following represents brief descriptions of the drawings, wherein.

DETAILED DESCRIPTION

Figure 1:
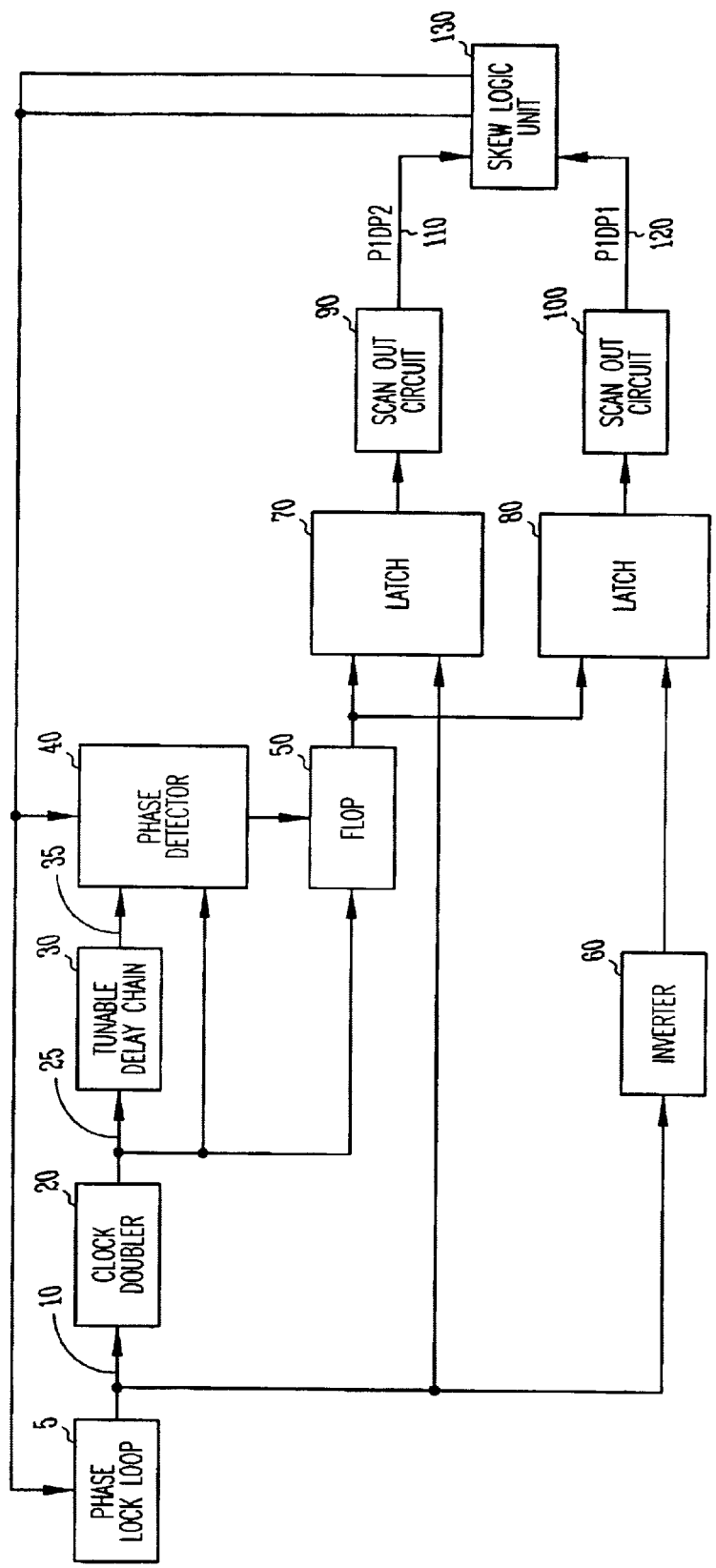
FIG. 1 is an overall systems diagram of an example embodiment of the present invention.

Before beginning a detailed description of the subject invention, mention of the following is in order. When appropriate, like reference numerals and characters may be used to designate identical, corresponding or similar components in differing figure drawings. Further, in the detailed description to follow, exemplary sizes/models/values/ranges may be given, although the present invention is not limited to the same. As a final note, well-known components of computer networks may not be shown within the FIGS. for simplicity of illustration and discussion, and so as not to obscure the invention.

FIG. 1 is an overall systems diagram of an example embodiment of the present invention. A phase lock loop (PLL) 5 connected to a quartz crystal based clock (not shown) generates a signal 10 in which the clock signal cycles from low to high or 0 to 1 and then from high to low or 1 to 0. A clock doubler 20 receives the signal 10 and generates a clock signal 25. An example of such a clock signal 25 may be seen in the clock signal 400 shown in FIG. 3 and the clock signal 500 shown in FIG. 4. This clock signal 10 is simultaneously distributed to clock doubler 20, latch 70, and an inverter 60. In turn, clock doubler 20 amplifies and splits the signal 10 into three identical clock signals. These clock signals 25 are transmitted to the phase detector 40, the tunable delay chain (hereafter "delay chain") 30 and the flop 50. The delay chain 30 serves to provide variable and adjustable time delay for the clock signal 25. This time delay of clock signal 25 is exemplified by clock signal 410 in FIG. 3 and clock signal 510 in FIG. 4. The phase detector 40 receives both the unchanged clock signal 25 from the clock doubler 20 and the time delayed clock signal 35 from the delay chain 30. This phase detector 40 will compare the leading edges of the two signals received to determine if they match. When both signals have leading edges that occur at the same time, the phase detector 40 will set its output signal to one or high, otherwise the output signal would be set to zero or low. This output signal is transmitted to flop 50 which acts to temporarily store the results of the signal along with the clock signal 25 received from the clock doubler 20. Thereafter, flop 50 transmits an output signal to both latch 70 and latch 80. Both latch 70, also referred to as a first latch, and latch 80, also referred to as a second latch, act to maintain the signal as either one or zero. In addition, latch 70 receives, as input, clock cycle signal 10 while latch 80 also receives clock cycle signal 10 after it has passed through inverter 60. Inverter 60 serves to invert or flip the clock cycle signal 10 from low to high or 0 to 1 and from high to low or 1 to 0.

Still referring to FIG. 1, the combined value from latch 70 is sent to the scan out circuit 90 which in turn transmits a signal 110 which is either set to high or low, one or zero, to a skew logic unit 130. If signal 110 is set to one or high this would indicate that the leading edge of cycle P1 (Phase 1) in clock signal 500 and the leading edge of clock cycle DP2 (Delayed Phase 2) of delayed clock signal 510, shown in FIG. 4, coincide. The combined value from latch 80 is sent to the scan out circuit 100 which in turn transmits it to skew logic unit 130 through signal 120. If signal 120 is set to high or one this would indicate that the leading edge of clock cycle P2 (Phase 2) of clock signal 400 coincides with the leading edge of clock cycle DP1 (Delayed Phase 1) of delayed clock signal 410, shown in FIG. 3.

Still referring to FIG. 1, there exist four possible combinations for signal 110 and signal 120 in which both may be zero, both may be one, signal 110 may be one while signal 120 may be zero or signal 110 may be zero and signal 120 may be equal to one. Based upon the values of signal 110 signal 120 it is possible to determine if clock duty cycle skew exists and by how much and in which direction to correct for clock duty cycle skew.

Figure 2B:
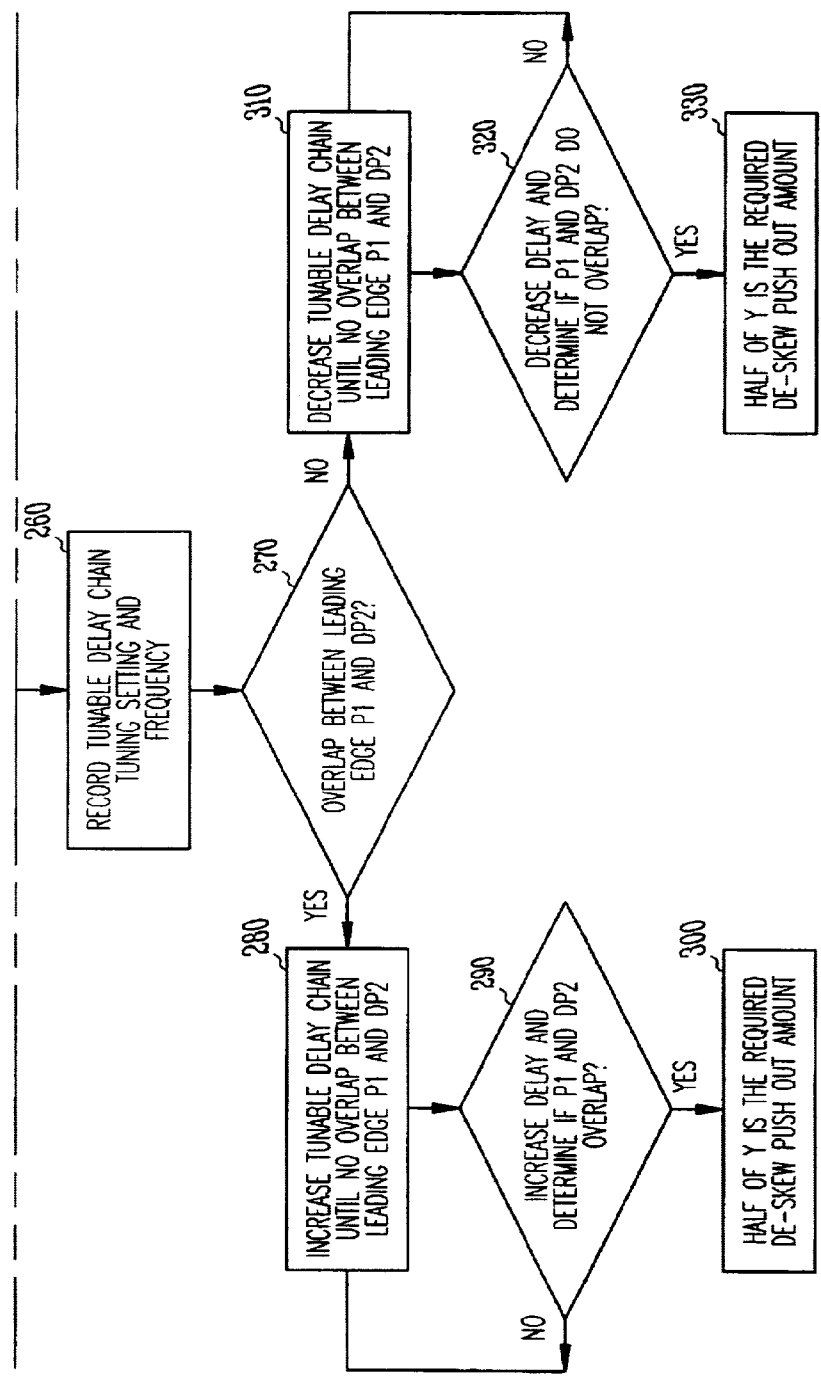
FIG. 2 is a flowchart of an example embodiment of the present invention in which clock duty cycle skew is detected and corrected.

FIG. 2 is a flowchart of an example embodiment of the present invention in which clock duty cycle skew is detected and corrected by the skew logic unit 130. The flowchart shown in FIG. 2 depicts software, commands, firmware, hardware, instructions, computer programs, subroutines, code and code segments. The elements shown in FIG. 2 may take any form of logic executable by a processor, including, but not limited to programming languages, such as, but not limited to, C++.

Figure 3:
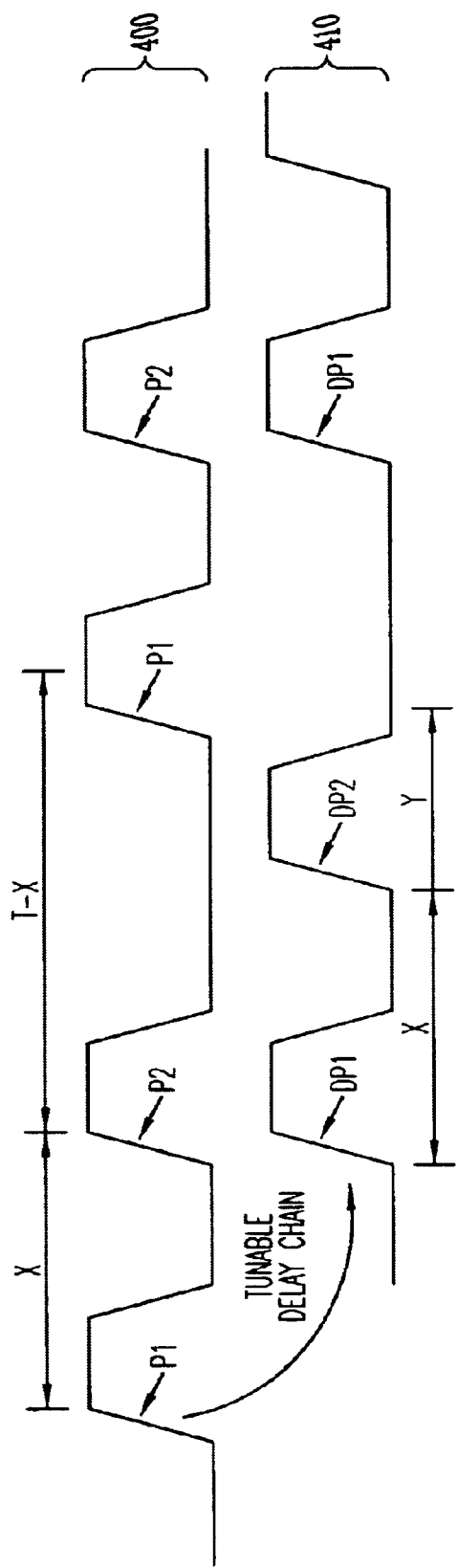
FIG. 3 is an example timing diagram of a skewed clock signal and a delayed clock signal.
Figure 4:
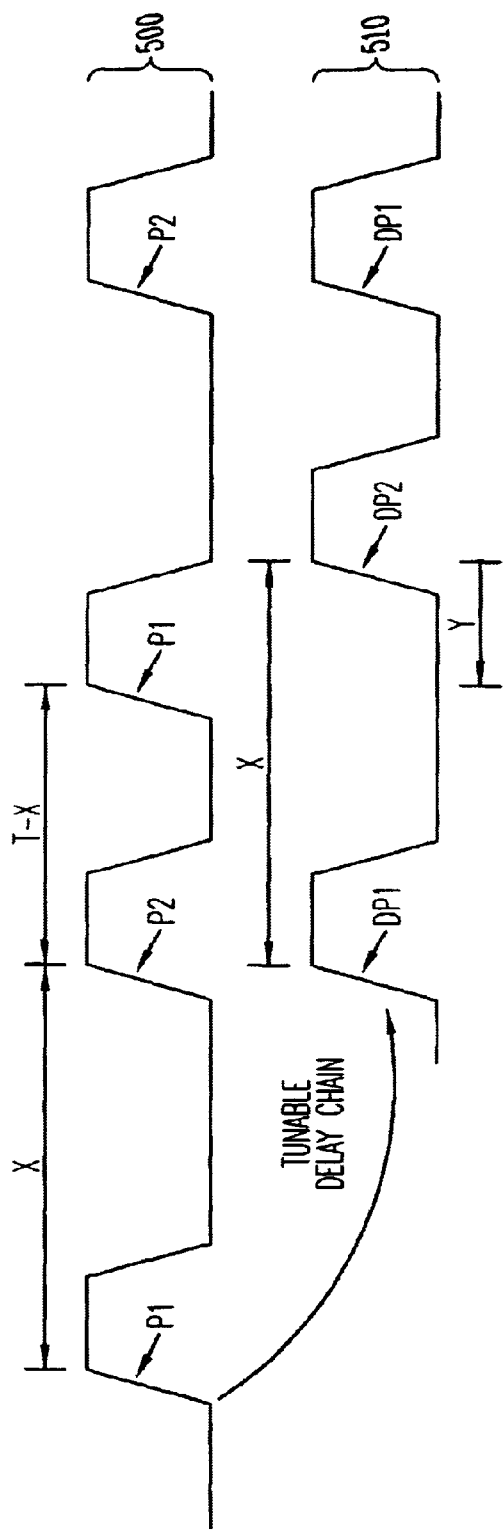
FIG. 4 is another example timing diagram of a skewed clock signal and a delayed clock signal.

Still referring to FIG. 2, the skew logic unit 130 begins execution in operation 210. In operation 210 skew logic unit 130 begins monitoring clock signal 25 and delayed clock signal 35 when signal 10 generated by PLL 5 is at a low frequency. This acts to serve as a convenient starting point for monitoring of clock skew in clock cycle signal 25 and a start time for variable X shown in FIG. 3 and FIG. 4. and discussed in further detail ahead. In operation 220, the difference between the leading edge of clock cycle P2 and the leading edge of clock cycle DP1, as depicted in FIGS. 3 and 4, is determined. Processing then proceeds to operation 230 where it is determined if there is an overlap between the leading edge of clock cycle P2 and the leading edge of clock cycle DP1, as depicted in FIGS. 3 and 4. This overlap would be indicated by signal 120, shown in FIG. 1, being set to high or one. If no overlap is found to exist between the leading edge of clock cycle P2 and the leading edge of clock cycle DP1 in operation 230, then processing returns to operation 220. However, if the leading edge of clock cycle P2 and the leading edge of clock cycle DP1 do overlap, as would be indicated by signal 120 being set high or equal to one, processing then proceeds to operation 240. In operation 240, the skew logic unit 130 monitors the point in time when there is no further overlap between the leading edge of clock cycle P2 and the leading edge of clock cycle DP1. This would be indicated by signal 120, shown in FIG. 1, returning to a value of low or zero. The time duration or period determined in operation 240 is represented by the value X shown in FIG. 3 and FIG. 4. The usage of the value X in identifying clock duty cycle skew and correcting for this clock duty cycle skew will be discussed in further detail in reference to FIGS. 3 and 4. Processing then proceeds to operation 250 where it is determined if the leading edge of clock cycle P2 and the leading edge of clock cycle DP1 no longer overlap. If overlap still is present between the leading edge of clock cycle P2 and the leading edge of clock cycle DP1, processing returns to operation 240. However, if no further overlap between the leading edge of clock cycle P2 and the leading edge of clock cycle DP1 exists, then processing proceeds operation 260. In operation 260, the delay chain 30 settings and frequency are recorded. The point in time when the leading edge of P2 and the leading edge of DP1 overlap represents the end of the time period X and the beginning of T-X as shown and further discussed in reference to FIG. 3 and FIG. 4. Thereafter, processing proceeds to operation 270.

Still referring to FIG. 2, in operation 270 it is determined whether the leading edge of clock cycle P1 and the leading edge of clock cycle DP2 overlap as would be indicated by signal 110, shown in FIG. 1, being set to one or high. If the leading edge of clock cycle P1 and the leading edge of clock cycle DP2 overlap, then processing proceeds to operation 280 and would be illustrated by clock signal 400 and delayed clock signal 410 as shown in FIG. 3. In operation 280, the delay period caused by delay chain 30 for the delay clock signal 410 would be increased until no further overlap is detected between clock cycle P1 and clock cycle DP2. This elimination of the overlap between the leading edge of clock cycle P1 and the leading edge of clock cycle DP2 would be indicated by signal 110 returning to zero or a low value. Processing then proceeds to operation 290 where the delay caused by delay chain 30 is increased and again it is determined whether the leading edge of clock cycle P1, in clock signal 400, and the leading edge of clock cycle DP2, in clock signal 410, overlap as would be indicated by signal 110, shown in FIG. 1, being set to one or high. If in operation 290 the leading edge of clock cycle P1 and the leading edge of clock cycle DP2 do not overlap then processing returns to operation 280. However, if in operation 290 it is found that the leading edges of clock cycles P1 and DP2 do overlap then processing proceeds operation 300. This return of overlap between the leading edges of clock cycles P1 and DP2 would mark the end of the time period T-X, shown in FIG. 3. In operation 300, half of value Y, shown in FIG. 3, is determined and the clock signal 400 is de-skewed and pushed out to the right by half the value of Y. Y represents the difference between X and T-X which were previously determined. Therefore, as shown in FIG. 3, the time period between the leading edge of DP1 and the leading edge of DP2 has to be increased by half of Y in order for all clock duty cycle cycles to be of equal length and time duration.

Still referring to FIG. 2, in the case where the leading edge of clock cycle P1 and the leading edge of clock cycle DP2 do not overlap, processing proceeds from operation 270 to operation 310. In operation 310, the delay caused by delay chain 30, shown in FIG. 1, is decreased until the leading edge of clock cycle P1 and the leading edge of clock cycle DP2, shown in FIG. 4, overlap. This overlap would be indicated by signal 110, shown in FIG. 1, being set to one. Thereafter, in operation 320, the delay caused by the delay chain 30 is decreased and it is determined whether the leading edge of clock cycle P1 and the leading edge of clock cycle DP2 still overlap or are equal to one or high. If no overlap is detected in operation 320 then processing returns to operation 310. However, if overlap is detected between the leading edge of clock cycle P1 and the leading edge of clock cycle DP2 as would be indicated by signal 110 being set to one or high, then processing proceeds operation 330. In operation 330, half the value of Y, shown in FIG. 4, would be used as a de-skew value in order to push clock signal 500 to the left. Again, Y represents the difference between X and T-X, shown in FIG. 4. In this case, the time difference between the leading edge of DP1 and the leading edge of DP2, shown in FIG. 4, must be reduced by half the value of Y in order for the delayed clock signal 510 to have clock duty cycle cycles of equal time duration.

The mathematical formulas underlying operations 270 through 330 shown in FIG. 2 which enables the de-skewing of an otherwise skewed clock signal 25 is as follows:

$$X+Y=T-X \rightarrow Y=T-2X \rightarrow X+Y/2=X+(T-2X)/2=T/2$$

As illustrated by FIG. 3 in FIG. 4, X is the distance between the leading edge of clock cycle P1 and the leading edge of clock cycle P2 in clock signal 400 and clock signal 500. X is also the distance between the leading edge of clock cycle DP1 and the leading edge of clock cycle DP2 in the delayed clock signal 410 and 510. T-X starts at the time when the clock signal 400 and clock signal 500 transition from zero to one, low to high, for clock cycle P2. T-X ends when again P1 transitions from a value of low or 0 to high or 1. Variable Y is the difference between the start of clock cycle DP2 in clock signal 410 and clock signal 510 and the start of the second clock cycle P1 and clock signal 400 and clock signal 500. Y/2 is the amount that X must be compensated by in order for all clock duty cycle cycles to be of equal time periods. The direction or sign of Y is determined by the logic shown in FIG. 2.

The benefit resulting from the present invention is that clock duty cycle skew can be detected and corrected using a simple deterministic device and method which can be built into each microprocessor chip. This eliminates the need for external equipment and requires a minimal amount of space on the processor chip. Therefore, microprocessors may continue to increase in speed while still employing clocks that generate a certain amount of clock duty cycle skew.

While we have shown and described only a few examples herein, it is understood that numerous changes and modifications as known to those skilled in the art could be made to the example embodiment of the present invention. Therefore, we do not wish to be limited to the details shown and described herein, but intend to cover all such changes and modifications as are encompassed by the scope of the appended claims.

I claim:

1. A method of correcting clock duty cycle skew, comprising:
    generating a clock signal having clock cycles;
    delaying the clock signal by a clock cycle to generate a delayed clock signal;
    measuring the time interval between a phase 1 clock cycle and a phase 2 clock cycle in the clock signal and storing it as a first time period;
    measuring the time interval between the phase 2 clock cycle and a second phase 1 clock cycle in the clock signal and storing it as a second time period;
    determining when a delayed phase 2 clock cycle of the delayed clock cycle is high;
    subtracting the first time interval from the second time interval to yield a third time interval; and
    adjusting the start of the delayed phase 2 clock cycle by half of the third time interval so that the intervals between delayed clock cycles in delayed clock signal are of equal duration.

2. The method recited in claim 1, further comprises:
    controlling the operation of a microprocessor using the delayed clock signal adjusted so that the intervals between delayed clock cycles in delayed clock signal are of equal duration.

3. The method recited in claim 1, wherein the adjusting of the start of the delayed phase 2 clock cycle further comprises:
    determining the direction of adjustment of the start of the delayed phase 2 clock cycle.

4. The method recited in claim 3, wherein the direction of adjustment of the start of the delayed phase 2 clock cycle causes the start of delayed phase 2 clock cycle to be delayed by half of the third time interval when a phase 1 cycle of the clock signal has a value equal to high at the same time as the delayed phase clock cycle.

5. The method recited in claim 3, wherein the direction of adjustment of the start of the delayed phase 2 clock cycle causes the start of delayed phase 2 clock cycle to be earlier by half of the third time interval when a phase 1 cycle of the clock signal has a value equal to opposite that of the delayed phase clock cycle at the same time.

6. The method recited in claim 4, wherein the third interval value is determined by increasing the delay of the delayed clock signal until phase 1 clock cycle and delayed phase 2 clock cycle have opposite values to one another, and the delay of the delayed clock signal is incrementally increased until the phase 1 clock cycle and the delayed phase 2 clock cycle have the same value.

7. The method recited in claim 5, wherein the third interval value is determined by decreasing the delay of the delayed clock signal until phase 1 clock cycle and delayed phase 2 clock cycle have opposite values to one another, and the delay of the delayed clock signal is incrementally decreased until the phase 1 clock cycle and the delayed phase 2 clock cycle do not have the same value.

8. A device to correct clock duty cycle skew, comprising:
    a delay chain circuit to delay a clock signal and generate a delayed clock signal;

a phase detector connected to the delay chain circuit to receive and compare the clock signal and delayed clock signal, wherein the phase detector will output a value of one or high when a leading edge of a clock cycle from the clock signal and a leading edge of a delayed clock cycle of the delayed clock signal are both high or equal to 1;

a first latch connected to the clock signal and the phase detector to receive the clock signal and the output from the phase detector and generate a value of 1 or high;

an inverter connected to the clock signal to clip of the value of the clock signal;

a second latch connected to the inverter and the phase detector to receive the clock signal and the output from the phase detector and generate a value of 1 or high; and a skew logic unit connected to the first latch and the second latch to identify the presence of skew in the clock signal and adjust the delayed clock signal to compensate for the skew.

9. The device recited in claim 8, wherein the first latch will output a value of one or high when the leading edge of a phase 1 clock cycle of the clock signal matches the leading edge of a delayed phase 2 clock cycle of the delayed clock signal.

10. The device recited in claim 9, wherein the second latch will output a value of one or high when the leading edge of a phase 2 clock cycle of the clock signal matches the leading edge of a delayed phase 1 clock cycle of the delayed clock signal.

11. The device recited in claim 10, wherein the skew logic unit will determine a first time interval based on detection of the leading edge of the phase 1 clock cycle of the clock signal and the leading edge of the phase 2 clock cycle of the clock signal.

12. The device recited in claim 11, wherein the skew logic unit will determine a second time interval based on detection of the leading edge of the phase 2 clock cycle of the clock signal and the leading edge of a second phase 1 clock cycle of the clock signal.

13. The device recited in claim 12, wherein the skew logic unit will determine a third time interval by subtracting the first time interval from the second time interval.

14. The device recited in claim 13, wherein the skew logic unit will determine a direction of adjustment of the start of the delayed phase 2 clock cycle to be earlier by half of the third time interval when a phase 1 cycle of the clock signal has a value equal to opposite that of the delayed phase clock cycle at the same time.

15. The device recited in claim 14, wherein the skew logic unit determines the third interval value by increasing the delay of the delayed clock signal until the phase 1 clock cycle and the delayed phase 2 clock cycle have opposite values to one another, and the delay of the delayed clock signal is incrementally increased until the phase 1 clock cycle and the delayed phase 2 clock cycle have the same value.

16. The device recited in claim 14, wherein the skew logic unit determines the third interval value is determined by decreasing the delay of the delayed clock signal until phase 1 clock cycle and delayed phase 2 clock cycle have opposite values to one another, and the delay of the delayed clock signal is incrementally decreased until the phase 1 clock cycle and the delayed phase 2 clock cycle do not have the same value.

17. A computer program, comprising:

monitoring a clock signal having clock cycles;

delaying the clock signal by a clock cycle to generate a delayed clock signal;

measuring the time interval between a phase 1 clock cycle and a phase 2 clock cycle in the clock signal and storing it as a first time period;

measuring the time interval between the phase 2 clock cycle and a second phase 1 clock cycle in the clock signal and storing it as a second time period;

determining when a delayed phase 2 clock cycle of the delayed clock cycle is high;

subtracting the first time interval from the second time interval to yield a third time interval; and adjusting the start of the delayed phase 2 clock cycle by half of the third time interval so that the intervals between delayed clock cycles in delayed clock signal are of equal duration.

18. The computer program recited in claim 17, wherein the adjusting of the start of the delayed phase 2 clock cycle further comprises:

determining the direction of adjustment of the start of the delayed phase 2 clock cycle.

19. The computer program recited in claim 18, wherein the direction of adjustment of the start of the delayed phase 2 clock cycle causes the start of delayed phase 2 clock cycle to be delayed by half of the third time interval when a phase 1 cycle of the clock signal has a value equal to high at the same time as the delayed phase clock cycle.

20. The computer program recited in claim 18, wherein the direction of adjustment of the start of the delayed phase 2 clock cycle causes the start of delayed phase 2 clock cycle to be earlier by half of the third time interval when a phase 1 cycle of the clock signal has a value equal to opposite that of the delayed phase clock cycle at the same time.

21. The computer program recited in claim 19, wherein the third interval value is determined by increasing the delay of the delayed clock signal until phase 1 clock cycle and delayed phase 2 clock cycle have opposite values to one another, and the delay of the delayed clock signal is incrementally increased until the phase 1 clock cycle and the delayed phase 2 clock cycle have the same value.

22. The computer program recited in claim 20, wherein the third interval value is determined by decreasing the delay of the delayed clock signal until phase 1 clock cycle and delayed phase 2 clock cycle have opposite values to one another, and the delay of the delayed clock signal is incrementally decreased until the phase 1 clock cycle and the delayed phase 2 clock cycle do not have the same value.

* * * * *